US011807783B2

United States Patent
Kawase et al.

(10) Patent No.: US 11,807,783 B2
(45) Date of Patent: Nov. 7, 2023

(54) LIQUID COMPOSITION, METHOD OF MANUFACTURING ELECTRODES AND METHOD OF MANUFACTURING ELECTROCHEMICAL DEVICE

(71) Applicant: RICOH COMPANY, LTD., Tokyo (JP)

(72) Inventors: Hiromitsu Kawase, Kanagawa (JP); Yuu Zama, Kanagawa (JP); Okitoshi Kimura, Kanagawa (JP); Kohji Matsuoka, Kanagawa (JP); Ryuji Higashi, Kanagawa (JP); Yusuke Kanno, Kanagawa (JP); Hideo Yanagita, Tokyo (JP); Masahiro Masuzawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 171 days.

(21) Appl. No.: 17/176,496

(22) Filed: Feb. 16, 2021

(65) Prior Publication Data
US 2021/0261796 A1     Aug. 26, 2021

(30) Foreign Application Priority Data

Feb. 25, 2020   (JP) ................................ 2020-029894

(51) Int. Cl.
*C09D 5/24*     (2006.01)
*C09D 4/00*     (2006.01)
(Continued)

(52) U.S. Cl.
CPC ................. *C09D 5/24* (2013.01); *C09D 4/00* (2013.01); *C09D 133/14* (2013.01);
(Continued)

(58) Field of Classification Search
CPC .......... C09D 5/24; C09D 4/00; C09D 133/14; C09D 135/02; H01M 10/0525;
(Continued)

(56) References Cited

U.S. PATENT DOCUMENTS

| 4,837,096 A | 6/1989 | Kimura et al. |
|---|---|---|
| 4,886,572 A | 12/1989 | Kimura et al. |

(Continued)

FOREIGN PATENT DOCUMENTS

| JP | 4392881 | 1/2010 |
|---|---|---|
| JP | 4747449 | 8/2011 |
| JP | 5571304 | 8/2014 |

OTHER PUBLICATIONS

Wang, Shi, et al. "High-performance all-solid-state polymer electrolyte with controllable conductivity pathway formed by self-assembly of reactive discogen and immobilized via a facile photopolymerization for a lithium-ion battery." ACS applied materials & interfaces 10.30 (2018): 25273-25284. (Year: 2018).*

(Continued)

*Primary Examiner* — Stewart A Fraser
(74) *Attorney, Agent, or Firm* — Grüneberg and Myers PLLC

(57) ABSTRACT

A liquid composition for manufacturing electrodes contains a radical polymerizable composition containing an ethylenically unsaturated compound having an oxyethylene group and a polymerization inhibitor, wherein infrared absorption spectra before curing the radical polymerizable composition include a first absorption band in a range of 1640 to 1620 $cm^{-1}$, a second absorption band in a range of 1430 to 1400 $cm^{-1}$, and a third absorption band in a range of 820 to 800 $cm^{-1}$, and the second absorption band has a greater absorption intensity than the third absorption band, and the third absorption band has a greater absorption intensity than the first absorption band, and
wherein the infrared absorption spectra after curing the radical polymerizable composition are substantially free of the first absorption band, the second absorption band, and third absorption band.

19 Claims, 3 Drawing Sheets

(51) Int. Cl.
*C09D 133/14* (2006.01)
*C09D 135/02* (2006.01)
*H01M 10/0585* (2010.01)
*H01M 10/0565* (2010.01)
*H01M 10/0525* (2010.01)

(52) U.S. Cl.
CPC ...... *C09D 135/02* (2013.01); *H01M 10/0525* (2013.01); *H01M 10/0565* (2013.01); *H01M 10/0585* (2013.01); *H01M 2300/0082* (2013.01); *H01M 2300/0085* (2013.01)

(58) Field of Classification Search
CPC ......... H01M 10/0565; H01M 10/0585; H01M 2300/0082; H01M 2300/0085
See application file for complete search history.

(56) References Cited

U.S. PATENT DOCUMENTS

| | | |
|---|---|---|
| 4,948,685 A | 8/1990 | Ohsawa et al. |
| 4,999,263 A | 3/1991 | Kabata et al. |
| 5,011,751 A | 4/1991 | Yoneyama et al. |
| 5,037,713 A | 8/1991 | Yoshino et al. |
| 5,077,152 A | 12/1991 | Yoshino et al. |
| 5,100,437 A | 3/1992 | Yoshino et al. |
| 5,162,178 A | 11/1992 | Ohsawa et al. |
| 5,223,353 A | 6/1993 | Ohsawa et al. |
| 5,437,943 A | 8/1995 | Fujii et al. |
| 5,489,492 A | 2/1996 | Asami et al. |
| 6,013,393 A | 1/2000 | Taniuchi et al. |
| 7,807,072 B2 | 10/2010 | Choi et al. |
| 2016/0028110 A1* | 1/2016 | Yu ................... H01M 10/0565 429/303 |
| 2018/0254152 A1* | 9/2018 | Matsuo ................. C08K 5/435 |
| 2018/0261827 A1 | 9/2018 | Yanagita et al. |
| 2019/0288259 A1 | 9/2019 | Ohkimoto et al. |
| 2020/0044254 A1* | 2/2020 | Saito ................. H01M 10/0525 |
| 2020/0119333 A1 | 4/2020 | Masuzawa et al. |
| 2020/0220160 A1 | 7/2020 | Nakajima et al. |
| 2020/0235375 A1 | 7/2020 | Nakajima et al. |
| 2020/0243851 A1 | 7/2020 | Takauji et al. |

OTHER PUBLICATIONS

Kuwabata, Susumu, and Masahide Tomiyori. "Rechargeable lithium battery cells fabricated using poly (methyl methacrylate) gel electrolyte and composite of V 2 O 5 and polypyrrole." Journal of the Electrochemical Society 149.8 (2002): A988. (Year: 2002).*
Li, Hao, et al. "Preparation and properties of poly (ethylene oxide) gel filled polypropylene separators and their corresponding gel polymer electrolytes for Li-ion batteries." Electrochimica Acta 56.6 (2011): 2641-2647. (Year: 2011).*
Chuhong Zhang et al., "Ionic Conductivity in the Solid Glyme Complexes", EastChem, School of Chemistry, University of St. Andrews, St. Andrews, Fife KY16 9ST, Scotland, May 2007, pp. 8700-8701.
U.S. Appl. No. 07/269,951, filed Nov. 10, 1988.
U.S. Appl. No. 07/483,267, filed Feb. 16, 1990.
U.S. Appl. No. 07/879,172, filed May 6, 1992.
U.S. Appl. No. 08/363,874, filed Dec. 27, 1994.
U.S. Appl. No. 08/653,318, filed May 24, 1996.
U.S. Appl. No. 08/498,801, filed Jul. 6, 1995.
U.S. Appl. No. 08/591,351, filed Jan. 25, 1996.

* cited by examiner

US 11,807,783 B2

LIQUID COMPOSITION, METHOD OF MANUFACTURING ELECTRODES AND METHOD OF MANUFACTURING ELECTROCHEMICAL DEVICE

CROSS-REFERENCE TO RELATED APPLICATIONS

The present application claims priority under 35 U.S.C. § 119 to Japanese Patent Application No. 2020-029894, filed Feb. 25, 2020. The contents of which are incorporated herein by reference in their entirety.

BACKGROUND OF THE INVENTION

Field of the Invention

The present invention relates to a liquid composition used in the manufacture of electrodes, a method for manufacturing electrodes, and a method for manufacturing an electrochemical device.

Description of the Related Art

In recent years, a variety of items not connected to the Internet (e.g., sensor devices, buildings, cars, electronic devices) have been connected via networks to servers and cloud services (IOT: Internet of Things), enabling the creation of higher value and services.

For wearable and sensor devices, factors such as vibration, shock, and operating ambient temperature of the device are likely to affect the electrochemical devices included in the IOT device. Therefore, internal short circuit of an electrochemical device, gasification of the electrolyte liquid due to internal short circuit of the electrochemical device, expansion of the electrochemical device due to gasified electrolyte, ignition, and the like are likely to occur.

RELATED-ART DOCUMENT

Patent Documents

[Patent Document 1] Japanese Patent No. 4747449
[Patent Document 2] Japanese Patent No. 5571304

Therefore, replacement of the electrolyte included in the electrochemical device with a gel electrolyte film has been studied (see, for example, Patent Document 1).

A method of forming an electrode composite material layer on an electrode substrate using a liquid composition that can be discharged by a liquid discharge method is known (see, for example, Patent Document 2).

The liquid discharge method is a method of discharging fine droplets of a liquid composition from a discharge hole of a liquid discharge head. Examples of the method for discharging droplets of the liquid discharge head include a piezo method, a thermal method, a valve method, and the like. In the piezo method, the discharge amount of the liquid composition can be accurately controlled by controlling the voltage, and the piezo method does not use heat. Therefore, the effect of the use environment is small, and the durability is high.

SUMMARY OF THE INVENTION

Problems to be Solved by the Invention

However, there is a problem in that it is difficult to form a gel electrolyte film by the liquid discharge method because the liquid composition used for forming the gel electrolyte film has a high viscosity.

An object of the present invention is to provide a liquid composition capable of forming a gel electrolyte film by a liquid discharge method.

Means for Solving the Problems

An aspect of the invention is a liquid composition for manufacturing electrodes, the liquid composition contains a radical polymerizable composition containing an ethylenically unsaturated compound having an oxyethylene group and a polymerization inhibitor, wherein infrared absorption spectra before curing the radical polymerizable composition include a first absorption band in a range of 1640 to 1620 $cm^{-1}$, a second absorption band in a range of 1430 to 1400 $cm^{-1}$, and a third absorption band in a range of 820 to 800 $cm^{-1}$, and the second absorption band has a greater absorption intensity than the third absorption band, and the third absorption band has a greater absorption intensity than the first absorption band, and
wherein the infrared absorption spectra after curing the radical polymerizable composition are substantially free of the first absorption band, the second absorption band, and third absorption band.

Effects of the Invention

According to the present invention, a liquid composition capable of forming a gel electrolyte film can be provided by a liquid discharge method.

DESCRIPTION OF THE EMBODIMENTS

Figure 1:
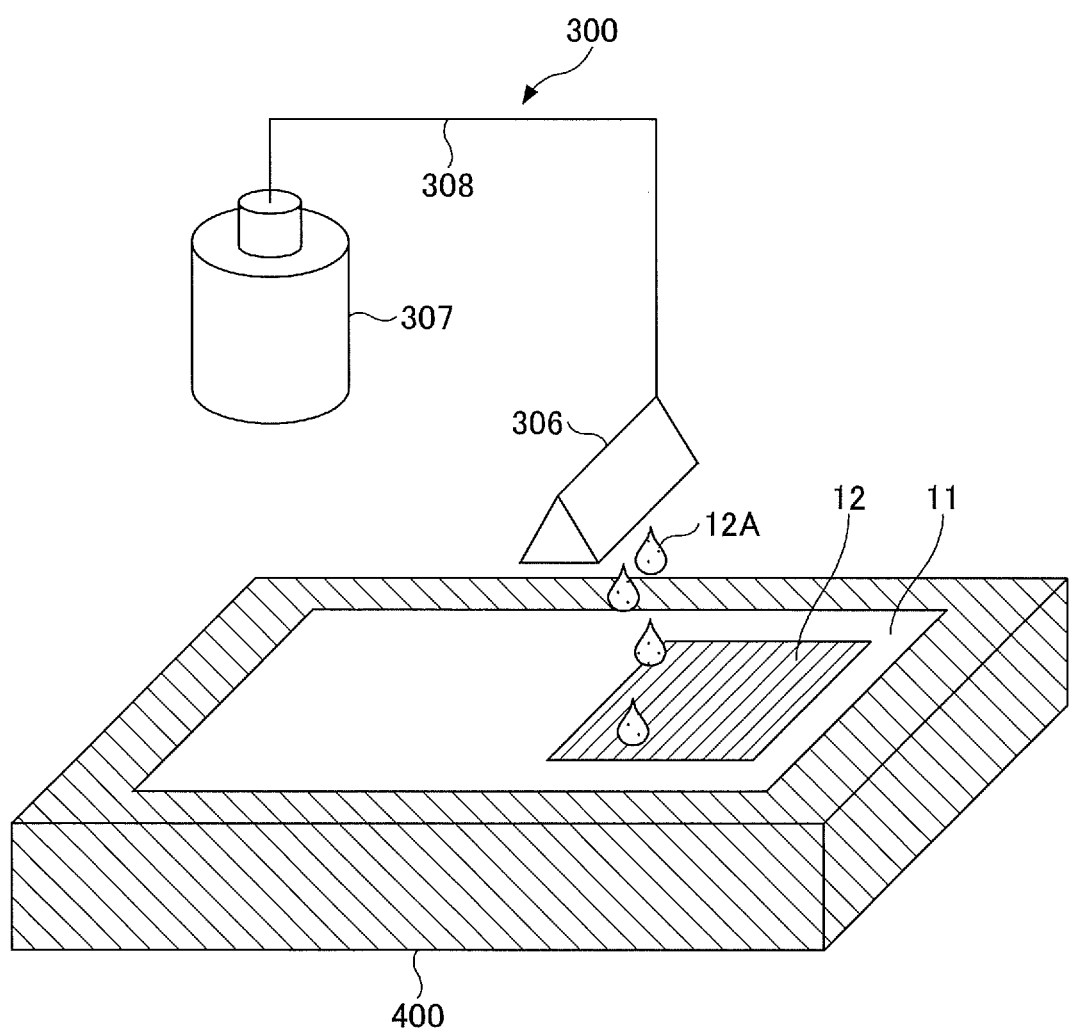
FIG. 1 is a schematic view illustrating an example of a method of manufacturing an electrode according to the present embodiment.

Hereinafter, embodiments for carrying out the present invention will be described with reference to the drawings. In some cases, the description of the same components may be omitted with the same reference numerals.

<Liquid Composition>

A liquid composition of the present embodiment is used in manufacturing electrodes.

The liquid composition of the present embodiment contains a radical polymerizable composition containing an ethylenically unsaturated compound having an oxyethylene group and a polymerization inhibitor.

In the present specification and claims, a composition containing X and Y refers to components of the composition are only X and Y.

A viscosity of the liquid composition of the present embodiment at 25° C. is preferably 30 mPa·s or less, and further preferably 18 mPa·s or less. When the viscosity of the liquid composition in the present embodiment is 30 mPa·s or less at 25° C., the liquid composition of the present embodiment can be favorably discharged.

<<Ethylenically Unsaturated Compounds with Oxyethylene Groups>>

An ethylenically unsaturated compound having an oxyethylene group may be used alone or in combination with two or more kinds.

In the present specification and claims, the term ethylenically unsaturated compound refers to a compound having one or more ethylenically unsaturated bonds (e.g., monomers, oligomers, or the like), preferably having an acryloyloxy group and/or a methacryloyloxy group.

An ethylenically unsaturated compound having an oxyethylene group preferably includes a group represented by the following general formula (I).

[Chemical Formula 1]

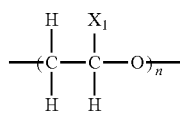

(I)

In the chemical formula above, $X_1$ indicates a hydrogen atom or a methyl group, and n is an integer of 1 to 24.

Examples of ethylenically unsaturated compounds having groups represented by a general formula (II) include a monofunctional ethylenically unsaturated compound having one ethylenically unsaturated bond, a bifunctional ethylenically unsaturated compound having two ethylenically unsaturated bonds, a trifunctional or more ethylenically unsaturated compound having three or more ethylenically unsaturated bonds, and the like.

Examples of monofunctional ethylenically unsaturated compounds include methoxypolyethylene glycol monoacrylate, methoxypolyethylene glycol monomethacrylate, a compound represented by the following chemical formula, and the like.

[Chemical Formula 2]

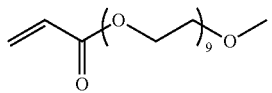

Examples of bifunctional ethylenically unsaturated compounds include polyethylene glycol diacrylate, neopentyl glycol diacrylate, dioxane glycol diacrylate, a compound represented by the following chemical formula, and the like.

[Chemical Formula 3]

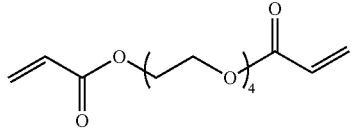

Examples of ethylenically unsaturated compounds having three or more functional groups include ethoxylated glycerin triacrylates, propoxylated glycerin triacrylates, trimethylolpropane triacrylates, ethoxylated trimethylolpropane triacrylates, propoxylated trimethylolpropane triacrylates, pentaerythritol tetraacrylates, ethoxylated pentaerythritol tetraacrylates, propoxylated pentaerythritol tetraacrylates, dipentaerythritol polyacrylates, ethoxylated dipentaerythritol polyacrylates, propoxylated dipentaerythritol polyacrylates, ethoxylated polyglycerin acrylates, dendric polymer acrylates, compounds represented by the following chemical formulae, and the like.

[Chemical Formula 4]

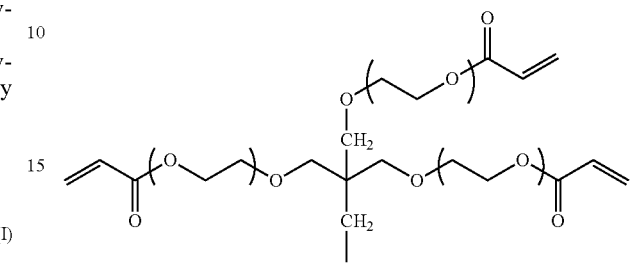

[Chemical Formula 5]

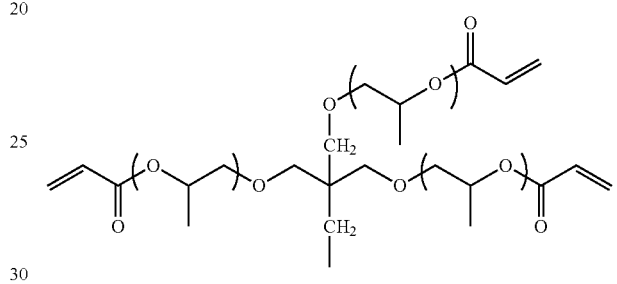

<<Polymerization Inhibitor>>

Examples of polymerization inhibitors include tetrabutylhydroquinone, 4-tetrautylpicatechol, dibutylhydroxytoluene, 1,1-diphenyl-2-picrylhydroradical, hydroquinone, phenothiazines, and the like. Among these, 1,4-benzoquinone, hydroquinone, and methoxyhydroquinone are particularly preferably used because these inhibitors have sublimation properties.

A mass ratio of the polymerization inhibitor to the ethylenically unsaturated compound is usually 1 to 5,000 ppm, preferably 5 to 5,000 ppm, and more preferably 10 to 500 ppm.

<<Curability of Radical Polymerizable Compositions>>

A curing process of the radical polymerizable composition can be analyzed using absorption bands derived from ethylenically unsaturated bonds in the infrared absorption spectra. Specifically, the degree of progression of curing of the radical polymerizable composition and the presence or absence of a residual ethylenically unsaturated compound having an oxyethylene group can be checked from the attenuation of a first absorption band (C═C stretching vibration band) in a range of 1,640 to 1,620 $cm^{-1}$ (hereinafter referred to as "A region"), a second absorption band (CH in-plane symmetrical bending vibration band) in a range of 1,430 to 1,400 $cm^{-1}$ (hereinafter referred to as "B region"), and a third absorption band (CH out-of-plane bending vibration band) in a range of 820 to 800 $cm^{-1}$ (hereinafter referred to as "C region").

The infrared absorption spectra before curing the radical polymerizable composition has a first absorption band in the A region, a second absorption band in the B region, and a third absorption band in the C region.

Here, the second absorption band has a greater absorption intensity than the third absorption band, and the third absorption band has a greater absorption intensity than the first absorption band. This improves the reactivity of the radical polymerizable composition.

In contrast, as the curing of the radical polymerizable composition progresses, the first, second, and third absorption bands in the infrared absorption spectra attenuate. Therefore, it is preferable that the infrared absorption spectra after curing the radical polymerizable composition are substantially free of the first absorption band, the second absorption band, and the third absorption band, and it is preferable that the absorption intensities of the first absorption band, the second absorption band, and the third absorption band are 0.00.

In the specification and claims, "are substantially free of the first absorption band, the second absorption band, and the third absorption band" refers that a first absorption band, a second absorption band, and a third absorption band corresponding to an ethylenically unsaturated compound having an amount of oxyethylene that may generate a gas that causes ignition are not included.

Thus, the radical polymerizable composition after the curing does not need to be completely cured, that is, cured free of leaving an ethylenically unsaturated compound having an oxyethylene group. The ethylenically unsaturated compound having an amount of oxyethylene groups that is not a concern for the generation of gas that causes ignition may remain uncured. For example, an amount that is not a concern for the generation of gas that causes ignition refers to the absorption intensities of the absorption bands that are 0.00 or less, that is, 0 to at least the second decimal place.

Examples of the curing include a process of adding 4.5 parts by mass of 1-hydroxycyclohexylphenyl ketone to 125 parts by mass of the radical polymerizable composition and emitting 2.4 J/cm$^2$ of ultraviolet light with a central wavelength of 365 nm under a nitrogen gas atmosphere; a process of heating the radical polymerizable composition at 80° C. for 6 hours under reduced pressure and then heating at 120° C. for 6 hours; and a process of adding 4.5 parts by mass of 1-hydroxycyclohexylphenyl ketone to 125 parts by mass of the radical polymerizable composition, heating at 80° C. for 6 hours under reduced pressure, and then heating at 120° C. for 6 hours.

<<Ethylenically Unsaturated Compound Free of Oxyethylene Group>>

The liquid composition of the present embodiment may further contain an ethylenically unsaturated compound free of an oxyethylene group.

The ethylenically unsaturated compound free of an oxyethylene group may be used alone or in combination with two or more kinds.

The ethylenically unsaturated compound free of an oxyethylene group is preferably a compound represented by the following general formula (II).

[Chemical Formula 6]

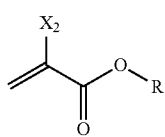

(II)

In the chemical formula above, $X_2$ indicates an alkyl group, a halogen atom, a cyano group, a nitro group, or an alkoxy group, whereas R indicates a group containing a halogen atom, a group containing a phosphate ester bond, a group containing a phosphonic acid group, —CO-group, —COO-group, —CON-group, or —S-group.

Examples of the alkyl groups in $X_2$ include a methyl group, an ethyl group, and the like.

Examples of the alkoxy groups in $X_2$ include a methoxy group, an ethoxy group, and the like.

The ethylenically unsaturated compound free of an oxyethylene group preferably has a halogen atom from the viewpoint of improving lithium ion conductivity of a gel electrolyte film.

When the liquid composition of the present embodiment further contains insulating inorganic particles, as described below, the ethylenically unsaturated compound free of an oxyethylene group is preferably a monomer having a carboxyl group or a phosphonic acid group, a phosphate ester monomer, and an oligomer having ethylenically unsaturated bonds, in view of the adhesion between the ethylenically unsaturated compound free of an oxyethylene group and the insulating inorganic particles contained in the gel electrolyte film.

Examples of ethylenically unsaturated compounds having a fluorine atom include heptadecafluorodecyl acrylate, octafluoropentyl acrylate, 2-perfluorooctylethyl acrylate, 2-perfluorooctylethyl methacrylate, 2-perfluoroisononyl ethyl acrylate, and the like.

For example, the ethylenically unsaturated compound having a carboxyl group is a compound represented by the following chemical formula.

[Chemical Formula 7]

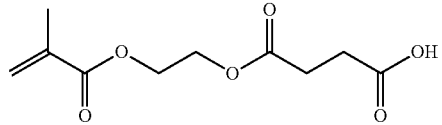

For example, an ethylenically unsaturated compound having a phosphonic acid group is a compound represented by the following chemical formula.

[Chemical Formula 8]

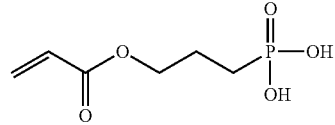

For example, an ethylenically unsaturated compound having a phosphate ester monomer is a compound represented by the following chemical formula.

[Chemical Formula 9]

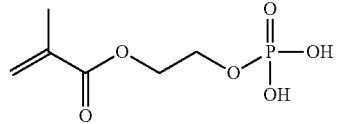

Examples of radical polymerizable oligomers include epoxy acrylate-based oligomers, urethane acrylate-based oligomers, polyester acrylate-based oligomers, and the like.

<<Lithium Salt>>

The liquid composition of the present embodiment preferably further contains a lithium salt. This improves the ionic conductivity of a gel electrolyte film.

Examples of lithium salts include lithium bis(fluorosulfonyl)imide (LiFSI), lithium bis(trifluoromethanesulfonyl)imide (LiTFSI), lithium hexafluorophosphate (LiPF$_6$), lithium perchlorate (LiClO$_4$), lithium chloride (LiCl), lithium borofluoride (LiBF$_4$), lithium hexafluoride (LiAsF$_6$), lithium trifluoromethanesulfonate (LiCF$_3$SO$_3$), lithium bis(trifluoromethylsulfonyl)imide (LiN(C$_2$F$_5$SO$_2$)$_2$), lithium bis(perfluoroethylsulfonyl)imide (LiN(CF$_2$F$_5$SO$_2$)$_2$), and the like. Two or more kinds may be used in combination. Among these, LiTFSI and LiFSI are particularly preferably used from the viewpoint of low deliquescence.

<Insulating Inorganic Particles>

Examples of the materials constituting the insulating inorganic particles include metal oxides, metal nitrides, and other metal compounds.

Examples of the metal oxides include Al$_2$O$_3$, TiO$_2$, BaTiO$_3$, ZrO$_2$, and the like.

Examples of metal nitrides include aluminum nitride, silicon nitride, and the like.

Examples of other metal compounds include poorly soluble ionic crystals such as aluminum fluoride, calcium fluoride, barium fluoride, barium sulfate, and the like; materials derived from mineral resources such as baemite, zeolite, apatite, kaolin, mullite, spinel, olivine, Sericite, bentonite, and the like; or artifacts thereof.

Examples of the material constituting the insulating inorganic particles other than the above include glass ceramics.

Examples of glass ceramics include crystallized glass ceramics using ZnO—MgO—Al$_2$O$_3$—SiO$_2$ based crystallized glass; and non-glass ceramics using BaO—Al$_2$O$_3$—SiO$_2$ based ceramics, Al$_2$O$_3$—CaO—SiO$_2$—MgO—B$_2$O$_3$ based ceramics, and the like.

The insulating inorganic particles preferably contain an element having ionic conductivity.

Examples of elements having ionic conductivity include silicon, aluminum, zirconium, and the like, and two or more kinds of elements may be used in combination.

The insulating inorganic particles are preferably Al$_2$O$_3$ (alumina) particles. With such configuration, a gel electrolyte film having high insulating properties and high heat resistance can be inexpensively formed.

The use of insulating inorganic particles suppresses any internal short circuiting of an electrochemical device and improves the safety of the electrochemical device. In addition, the ionic conductivity of the gel electrolyte film is improved because the surfaces of the insulating inorganic particles have the ionic conductivity. This improves the output of the electrochemical device.

The average particle size of the insulating inorganic particles is preferably 0.1 to 5 μm and more preferably 0.1 to 3 μm. This improves the ionic conductivity of the gel electrolyte film even when the usage amount of insulating inorganic particles is small.

The average particle size of the insulating inorganic particles can be measured by a laser diffraction method.

A mass ratio of ethylenically unsaturated compounds to insulating inorganic particles in the liquid composition of the present embodiment is preferably 0.5 to 50% and more preferably 0.5 to 20%. When the mass ratio of the ethylenically unsaturated compounds to the insulating inorganic particles in the liquid composition of the present embodiment is 0.5% or more, the peel strength of the gel electrolyte film is improved. When the mass ratio is 20% or less, the output of the electrochemical device is improved.

<<Dispersant>>

The liquid composition of the present embodiment may further contain a dispersant. This improves the dispersibility of the insulating inorganic particles.

Examples of commercially available dispersants include MEGAFAC series (manufactured by DIC), MALIALIM series (manufactured by NOF Corporation), KBY (manufactured by BYK Japan K.K.), Solsperse (manufactured by Lubrizol Corporation), Polyflow (manufactured by Kyoeisya Chemical Co., Ltd.), and the like.

<<Diluent>>

The liquid composition of the present embodiment may further contain a diluent. This improves the ionic conductivity of the gel electrolyte film.

A diluent is not particularly limited as long as the diluent can reduce the viscosity of the ethylenically unsaturated compounds. Therefore, the diluent may be selected according to the purpose. Examples of diluents include carbonate-based organic solvents such as a chain carbonate, a cyclic carbonate, and the like; alcohol-based solvents such as methanol, ethanol, propanol, butanol, and the like; ketone-based solvents such as acetone, methyl ethyl ketone, methyl isobutyl ketone, cyclohexanone, and the like; ester-based solvents such as ethyl acetate, butyl acetate, and the like; ether-based solvents such as tetrahydrofuran, dioxane, propyl ether, and the like; halogen-based solvents such as dichloromethane, dichloroethane, trichloroethane, chlorobenzene, and the like; aromatic solvents such as benzene, toluene, xylene, and the like; and cellosolve-based solvents such as methyl cellosolve, ethyl cellosolve, cellosolve acetate, and the like. Two or more kinds of diluents may be used in combination. Among these, carbonate-based organic solvents such as a chain carbonate or a cyclic carbonate are preferably used from the viewpoint of dissolving lithium salts at room temperature.

Examples of the chain carbonates include dimethyl carbonate (DMC), diethyl carbonate (DEC), methyl ethyl carbonate (EMC), methyl propionate (MP), and the like.

Examples of the cyclic carbonates include propylene carbonate (PC), ethylene carbonate (EC), butylene carbonate (BC), vinylene carbonate (VC), and the like.

When ethylene carbonate (EC) as a cyclic carbonate and dimethyl carbonate (DMC) as a chain carbonate are used in combination, the mixing ratio of ethylene carbonate (EC) and dimethyl carbonate (DMC) is not particularly limited and may be selected according to the purpose.

<<Polymerization Initiator>>

The liquid composition of the present embodiment may further contain a polymerization initiator.

Examples of the polymerization initiators include a thermal polymerization initiator, a photopolymerization initiator, and the like. Two or more kinds of polymerization initiators may be used in combination.

Thermal polymerization initiators are not particularly limited and are suitably selected according to a purpose. Examples of thermal polymerization initiators include peroxide-based initiators such as 2,5-dimethylhexane-2,5-dihydroperoxide, dicumyl peroxide, benzoyl peroxide, t-butyl-cumyl peroxide, 2,5-dimethyl-2,5-di(peroxybenzoyl)hexyne-3, di-t-butyl peroxide, t-butyl hydroperoxide, cumene hydroperoxide, lauroyl peroxide, and the like; and azo-based initiators such as azobis isobutyl nitrile, azobis cyclohexane carbonitrile, methyl azobis isobutyrate, azobis isobutylamidine hydrochloride, 4,4'-azobis-4-cyanovaleric acid, and the like.

Photopolymerization initiators are not particularly limited and are suitably selected according to a purpose. Examples of photopolymerization initiators include acetophenone-based or ketal-based photopolymerization initiators such as diethoxyacetophenone, 2,2-dimethoxy-1,2-diphenylethane-1-one, 1-hydroxy-cyclohexyl-phenyl-ketone, 4-(2-hydroxyethoxy)phenyl-(2-hydroxy-2-propyl)ketone, 2-benzyl-2-dimethylamino-1-(4-morpholinophenyl)butanone-1,2-hydroxy-2-methyl-1-phenylpropane-1-one, 2-methyl-2-morpholino(4-methylthiophenyl)propan-1-one, 1-phenyl-1,2-propanedione-2-(o-ethoxycarbonyl)oxime; and benzoin-based photopolymerization initiators such as benzoin, benzoin methyl ether, benzoin ethyl ether, benzoin isobutyl ether, benzoin isopropyl ether, and the like; benzophenone-based photopolymerization initiators such as benzophenone, 4-hydroxybenzophenone, methyl o-benzoylbenzoate, 2-benzoylnaphthalene, 4-benzoylbiphenyl, 4-benzoylphenyl ether, acrylated benzophenone, 1,4-benzoylbenzene, and the like; and thioxanthone-based photopolymerization initiators such as 2-isopropylthioxanthone, 2-chlorothioxanthone, 2,4-dimethylthioxanthone, 2,4-diethylthioxanthone, 2,4-dichlorothioxanthone, and the like.

Examples of other photopolymerization initiators include ethyl anthraquinone, 2,4,6-trimethylbenzoyl diphenyldiphenylphosphine oxide, 2,4,6-trimethyl benzoylphenylethoxyphosphine oxide, bis(2,4,6-trimethylbenzoyl) phenylphosphine oxide, bis(2,4-dimethoxybenzoyl)-2,4,4-trimethylpentylphosphine oxide, methylphenylglyoxy ester, 9,10-phenanthrene, acridine-based compound, triazine-based compound, imidazole-based compound, and the like.

The photopolymerization initiator and a photopolymerization accelerator may be used in combination.

Examples of photopolymerization accelerators include triethanolamine, methyldiethanolamine, ethyl 4-dimethylaminobenzoate, isoamyl 4-dimethylaminobenzoate, benzoic acid (2-dimethylamino)ethyl, 4,4'-dimethylaminobenzophenone, and the like.

A mass ratio of the polymerization initiator to the ethylenically unsaturated compound is preferably 0.5 to 40% and more preferably 1 to 20%.

<<Method of Preparing Liquid Compositions>>

The liquid compositions of the present embodiment can be prepared by mixing an ethylenically unsaturated compound having an oxyethylene group with a composition containing a polymerization inhibitor.

Examples of mixers used in mixing the compositions include bead mills, ball mills, planetary ball mills, vibration ball mills, sand mills, roll mills, high speed impeller dispersers, homogenizers, high speed impact mills, ultrasonic dispersers, agitator blades, and the like.

<Method of Manufacturing Electrodes>

The method of manufacturing electrodes of the present embodiment includes discharging the liquid composition of the present embodiment onto a substrate.

The substrate is not particularly limited as long as there is member constituting the electrode. Examples of the substrate include an electrode substrate, an electrode substrate having an electrode composite material layer, and the like.

The method of manufacturing the electrodes of the present embodiment preferably further includes a step of curing the liquid composition discharged to the substrate.

Methods for curing the liquid composition of the present embodiment include, for example, emitting light to the liquid composition under an inert gas atmosphere, heating the liquid composition under reduced pressure, and the like.

When the liquid composition of the present embodiment is subjected to be cured, it is preferable to raise the temperature to 100° C. or higher. This also serves as a dewatering process. In addition, the polymerization inhibitor is also expelled from the system or pyrolytically decomposed, thereby accelerating thermal polymerization of ethylenically unsaturated compounds.

When the liquid composition of the present embodiment is subjected to be cured, it is preferable to raise the temperature up to 60 to 150° C. and more preferably up to 60 to 150° C. under reduced pressure from the viewpoint of drying the liquid composition.

When the liquid composition of the present embodiment cures, the radical polymerizable composition cures, thereby forming a gel electrolyte film.

A method of heating the liquid composition of the present embodiment includes, for example, heating the liquid composition, using hot air from an inert gas such as argon or nitrogen, various heat media, infrared rays, or electromagnetic waves, from a side where the liquid composition is discharged or from a side where the liquid composition is not discharged.

Examples of methods of irradiating the liquid composition of the present embodiment include a method of emitting ultraviolet light with an ultraviolet light source such as a high-pressure mercury lamp or a metal halide lamp, and a method of emitting visible light with a visible light source.

The UV illumination is preferably 5 to 15,000 mW/cm$^2$.

FIG. 1 illustrates an example of a method for manufacturing electrodes of the present embodiment.

The method of manufacturing the electrodes includes a step of discharging a liquid composition 12A of the present embodiment (hereinafter referred to as a liquid composition 12A) onto an electrode substrate 11 using a liquid discharging device 300, and a step of heating the liquid composition 12A discharged onto the electrode substrate 11 under an inert gas atmosphere to form a gel electrolyte film 12.

The liquid composition 12A is stored in a tank 307 and supplied from the tank 307 through a tube 308 to a liquid discharge head 306.

The liquid discharging device 300 may also be provided with a configuration to cap a nozzle to prevent the liquid composition from drying when the liquid composition 12A is not discharged from the liquid discharge head 306.

In manufacturing the electrodes, the electrode substrate 11 is placed on a heated stage 400, droplets of the liquid composition 12A are discharged to the electrode substrate 11, and the liquid composition 12A discharged to the electrode substrate 11 is heated under an inert gas atmosphere to form the gel electrolyte film 12.

The stage 400 may then move, and the liquid discharge head 306 may move.

When the liquid composition 12A discharged onto the electrode substrate 11 is heated, the liquid composition 12A may be heated by the stage 400 or by a heating device other than the stage 400.

The heating devices are not particularly limited as long as the heating devices do not directly contact with the liquid composition 12 A. For example, resistive heating heaters, infrared heaters, fan heaters, and the like may be used.

A plurality of heating devices may be provided.

Next, an electrode can be obtained by forming an electrode composite material layer on the gel electrolyte film 12 in the same manner as above, except that the liquid composition for the electrode composite material layer is used.

Figure 2:
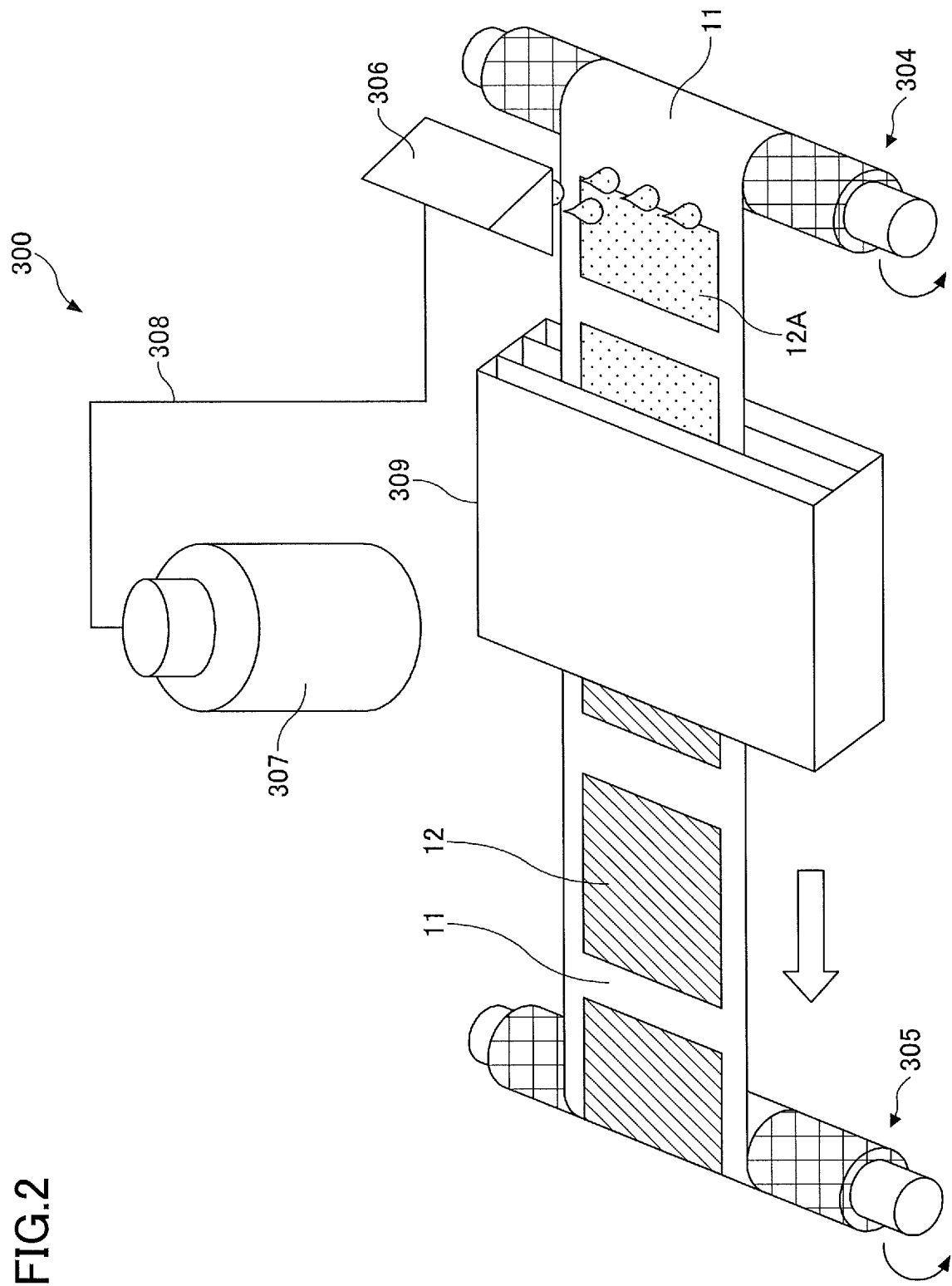
FIG. 2 is a schematic view illustrating another example of a method of manufacturing an electrode according to the present embodiment.

FIG. 2 illustrates another example of a method of manufacturing electrodes of the present embodiment.

The method of manufacturing the electrodes includes a step of discharging the liquid composition 12A onto the electrode substrate 11 using the liquid discharging device 300 and a step of heating the liquid composition 12A discharged onto the electrode substrate 11 to form the gel electrolyte film 12.

First, an elongated electrode substrate 11 is prepared. The electrode substrate 11 is wound around a cylindrical core, and the electrode substrate 11 is set to a feed roller 304 and a take-up roller 305 so that the side forming the gel electrolyte film 12 is on the upper side in the drawing. Here, the feed roller 304 and the take-up roller 305 rotate counterclockwise, and the electrode substrate 11 is conveyed in a right direction to the left direction in the drawing. Droplets of the liquid composition 12A are discharged from the liquid discharge head 306 disposed above the electrode substrate 11 between the feed roller 304 and the take-up roller 305 onto the electrode substrate 11 to be conveyed. The droplets of liquid composition 12A are discharged so as to cover at least a portion of the electrode substrate 11.

A plurality of liquid discharge heads 306 may be disposed in a direction substantially parallel to or substantially perpendicular to the conveying direction of the electrode substrate 11.

Next, the electrode substrate 11 in which the liquid composition 12A is discharged is conveyed to a heating device 309 by the feed roller 304 and the take-up roller 305. As a result, the liquid composition 12A discharged onto the electrode substrate 11 is heated to form the gel electrolyte film 12. At this time, the atmosphere in which the liquid composition 12A discharged onto the electrode substrate 11 is heated need not be in an inert gas atmosphere, and the gel electrolyte film 12 can be formed free of an inert gas atmosphere.

The heating device 309 is not particularly limited as long as the heating device does not directly contact with the liquid composition 12A. For example, resistive heating heaters, infrared heaters, fan heaters, and the like may be used.

The heating device 309 may be disposed on either one of the upper and lower portions of the electrode substrate 11, or a plurality of the heating devices may be disposed.

Next, electrodes can be obtained by forming an electrode composite material layer on the gel electrolyte film 12 in the same manner as above, except that the liquid composition for the electrode composite material layer is used.

The electrodes are then cut to the desired size, such as by punching.

Figure 3:
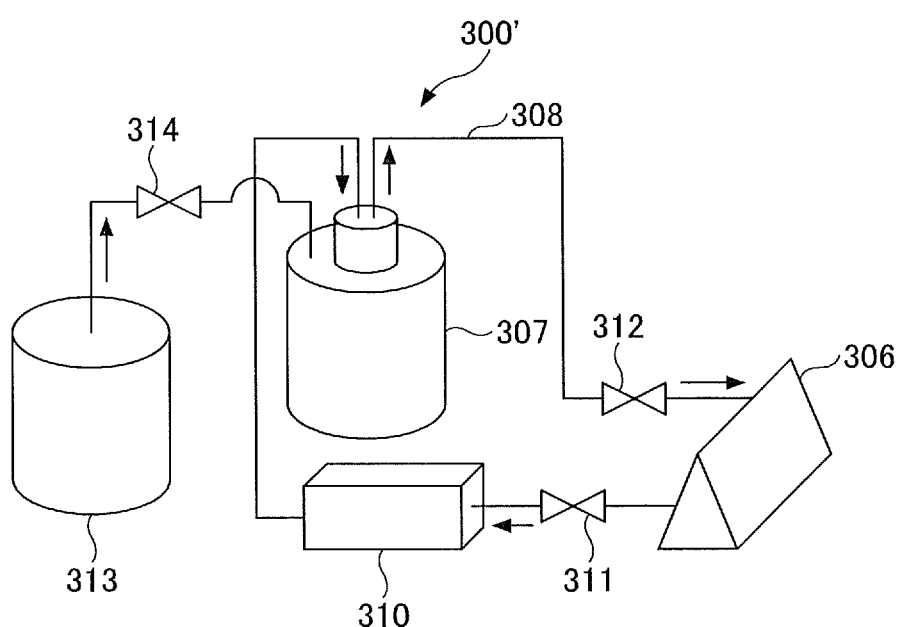
FIG. 3 is a schematic view illustrating a modified example of the liquid discharging device of FIGS. 1 and 2.

FIG. 3 illustrates a modification example of the liquid discharging device 300.

A liquid discharging device 300' controls a pump 310 and valves 311 and 312 to allow the liquid composition 12A to circulate through a liquid discharging head 306, a tank 307, and a tube 308.

When the amount of liquid composition 12A in the tank 307 is reduced, an external tank 313 that is provided in the liquid discharging device 300' can supply the liquid composition 12A from the external tank 313 to the tank 307 by controlling the pump 310 and the valves 311, 312, and 314.

The liquid discharging devices 300 and 300' can be used to discharge the liquid composition 12A to the intended location of the electrode substrate 11. Further, when the liquid discharging devices 300 and 300' are used, surfaces that contact with the electrode substrate 11 and the gel electrolyte film 12 can be bonded to each other. Furthermore, the thickness of the gel electrolyte film 12 can be made uniform by using the liquid discharging devices 300 and 300'.

<<Electrode Substrate>>

Examples of materials constituting negative-electrode substrate are not particularly limited as long as the materials are conductive materials. The materials can be appropriately selected depending on the purpose, for example, stainless steel, nickel, aluminum, copper, and the like can be used. Among these, stainless steel and copper are particularly preferably used.

The shape of the negative-electrode substrate is not particularly limited and may be appropriately selected depending on the purpose.

The size of the negative-electrode substrate is not particularly limited as long as the size is applicable to an electrochemical device, and the size can be appropriately selected depending on the purpose.

Examples of materials constituting positive-electrode substrate are not particularly limited as long as the materials are conductive materials. The materials can be appropriately selected depending on the purpose, for example, stainless steel, nickel, aluminum, copper, titanium, tantalum, and the like can be used. Among these, stainless steel and aluminum are particularly preferably used.

The shape of the positive-electrode substrate is not particularly limited and may be appropriately selected depending on the purpose.

The size of the positive-electrode substrate is not particularly limited as long as the size is applicable to an electrochemical device 1, and the size can be appropriately selected depending on the purpose.

<<Electrode Composite Material Layer>>

A negative-electrode composite material layer and a positive-electrode composite material layer include an active material (a negative-electrode active material or a positive-electrode active material). The composite material layers may further include a binder, a thickener, a conductive agent, and the like, as needed.

A slurry-formed liquid composition for the negative-electrode material layer contains a negative-electrode active material and further optionally contains a binder, a thickener, a conductive agent, a solvent, and the like is applied onto a negative-electrode substrate to form a negative-electrode material layer.

The methods for applying the liquid composition for the negative-electrode composite material layer are not particularly limited, and appropriately selected depending on the purpose. For example, die coating method, comma coating method, gravure coating method, screen coating method, dry-press coating method, dispenser coating method, liquid discharge method, and the like may be used. Among these, a liquid discharge method is preferably used.

The positive-electrode composite material layer can also be formed in the same manner as the negative-electrode composite material layer.

An average thickness of the negative-electrode composite material layer is preferably 10 to 450 μm and more preferably 20 to 100 μm. When the average thickness of the negative-electrode composite material layer is 10 μm or more, energy density of the electrochemical device increases. When the average thickness of the negative-electrode composite material layer is 450 μm or less, cycle characteristics of the electrochemical device improves.

An average thickness of the positive-electrode composite material layer is preferably 10 to 300 μm and more preferably 40 to 150 μm. When the average thickness of the positive-electrode composite material layer is 10 μm or more, energy density of the electrochemical device increases. When the average thickness of the positive-electrode composite material layer is 300 μm or less, output of the electrochemical device improves.

The negative-electrode active material is not particularly limited as long as the negative-electrode active material can intercalate and deintercalate alkali ions such as lithium ions. Examples of the negative-electrode active materials include carbonaceous materials and the like.

Examples of carbonaceous materials include graphite such as coke, artificial graphite, natural graphite, pyrolysis products of organic matter under various pyrolysis conditions, amorphous carbon, and the like. Among these, artificial graphite, natural graphite, and amorphous carbon are particularly preferably used.

The positive-electrode active material is not particularly limited as long as the positive-electrode active material can intercalate and deintercalate alkali ions such as lithium ions. Examples of the positive-electrode active materials include an alkali metal containing transition metal compounds and the like.

Examples of alkali metal containing transition metal compounds include a lithium-nickel composite oxide represented by the following general formula:

$$LiNi_xCo_yMn_zO_2$$

where x+y+z=1, and
include a lithium-phosphate based material represented by the following general formula:

$$Li_xMe_y(PO_4)_z$$

where Me is a transition metal, 0.5≤x≤4, 0.5≤y≤2.5, 0.5≤z≤3.5.

Examples of lithium-nickel composite oxides include $LiNi_{0.33}Co_{0.33}Mn_{0.33}O_2$, $LiNi_{0.5}Co_{0.2}Mn_{0.3}O_2$, $LiNi_{0.6}Co_{0.2}Mn_{0.2}O_2$, and $LiNi_{0.8}Co_{0.2}Mn_0O_2$.

Examples of lithium-phosphate based materials include lithium vanadium phosphate ($Li_3V_2(PO_4)_3$), olivine iron ($LiFePO_4$), olivine manganese ($LiMnPO_4$), olivine cobalt ($LiCoPO_4$), olivine nickel ($LiNiPO_4$), and olivine vanadium ($LiVOPO_4$).

The lithium-phosphate based materials may be doped with heterogeneous elements.

Examples of binders include polyvinylidene fluoride (PVDF), PTFE, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropropylene, styrenebutadiene rubber (SBR), carboxymethyl cellulose, and the like. The binder may be used in combination of two or more.

Other binders include, for example, copolymers of two or more materials selected from the group of tetrafluoroethylene, hexafluoroethylene, hexafluoropropylene, perfluoroalkylvinyl ether, vinylidene fluoride, chlorotrifluoroethylene, ethylene, propylene, pentafluoropropylene, fluoromethylvinyl ether, acrylic acid, and hexadiene.

Examples of thickeners include propylene glycol, carboxymethylcellulose, and the like.

Examples of the conductive agents include graphite such as natural graphite, artificial graphite, and the like; carbon black such as acetylene black, ketchen black, channel black, furnace black, lamp black, thermal black, and the like; conductive fibers such as carbon fibers, metal fibers, and the like; metal powders such as fluorine carbon powder, aluminum powder, and the like; conductive whiskers such as zinc oxide whiskers, potassium titanate whiskers, and the like; conductive metal oxides such as titanium oxide; and organic conductive materials such as phenylene derivatives, graphene derivatives, and the like.

Examples of solvents include water, alcohol, N-methyl-2-pyrrolidone (NMP), toluene, and the like.

As the active materials in a fuel cell, for example, a catalyst support such as carbon, in which catalyst particles such as platinum particles, ruthenium particles, platinum alloy particles, and the like are supported on the surface, can be used.

An example of a method of manufacturing an electrode for a fuel cell will be described below.

First, a catalyst support is suspended in water and a precursor of catalyst particles is added to dissolve. Alkaline is then added to precipitate the metal hydroxide particles and to support them on the surface of the catalyst support. Next, after the liquid composition containing the catalyst support on which the metal hydroxide particles are carried on the surface is applied to an electrode substrate, the catalyst particles are formed by reducing the metal hydroxide under a hydrogen atmosphere or the like, and the electrode composite material layer is formed.

Examples of precursors of the catalyst particles include platinic chloride, dinitrodiamino platinum, platinum(II) chloride, platinum(IV) chloride, bis-acetylacetonate platinum, dichlorodiammine platinum, dichlorotetramine platinum, platinum(II) sulfate ruthenium chloride, iridium chloride, rhodium chloride, ferric chloride, cobalt chloride, chromium chloride, gold chloride, silver nitrate, rhodium nitrate, palladium chloride, nickel nitrate, iron sulfate, copper chloride, and the like.

Active materials in a solar cell include tungsten oxide, titanium oxide, oxide semiconductors such as $SnO_2$, ZnO, $ZrO_2$, $Nb_2O_5$, $CeO_2$, $SiO_2$, $Al_2O_3$, and the like.

The oxide semiconductors carry dyes.

Examples of dyes include ruthenium-tris transition metal complexes, ruthenium-bis transition metal complexes, osmium-tris transition metal complexes, osmium-bis transition metal complexes, ruthenium-cis-diaqua-bipyridyl complexes, phthalocyanine and porphyrins, organic-inorganic perovskite crystals, and the like.

<Method of Manufacturing Electrochemical Device>

A method of manufacturing an electrochemical device of the present embodiment includes the step of manufacturing the electrode of the present embodiment.

Examples of the electrochemical device include a storage device such as a lithium-ion secondary battery, a power generating device such as a fuel cell, and the like.

Applications of electrochemical devices include, but are not limited to, notebook PCs, pen input PCs, mobile PCs, electronic book players, cellular phones, portable faxes, portable copies, portable printers, headphone stereos, video movies, LCD TVs, handy cleaners, portable CDs, mini disks, transceivers, electronic pocketbooks, calculators, memory cards, portable tape recorders, radio, backup power supplies, motors, lighting fixtures, toys, game machines, clocks, strobe boxes, cameras, and the like.

EXAMPLES (Preparation of Monomer Solutions 1 to 4)

100 ppm of methoxyhydroquinone was dissolved in each compound represented by the following chemical formulae to obtain monomer solutions 1 to 4.

Methoxypolyethylene glycol #400 acrylate AM-90G (manufactured by Shin-Nakamura Chemical Co., Ltd.) is represented by the following chemical formula.

[Chemical Formula 10]

In the chemical formula above, an average value of n is 9.

Ethoxylated glycerin triacrylate (EO9 mol) A-GLY-9E (manufactured by Shin-Nakamura Chemical Co., Ltd.) is represented by the following chemical formula.

[Chemical Formula 11]

In the chemical formula above, an average of l+m+n is 9.

Polyethylene glycol #200 diacrylate A-200 (manufactured by Shin-Nakamura Chemical Co., Ltd.) is represented by the following chemical formula.

[Chemical Formula 12]

In the chemical formula above, an average value of n is 4.

Polyethylene glycol #400 diacrylate A-400 (manufactured by Shin-Nakamura Chemical Co., Ltd.) is represented by the following chemical formula.

[Chemical Formula 13]

In the chemical formula above, an average value of n is 9.

(Preparation of Radical Polymerizable Composition 1)

The monomer solution 4 (100 g) and the monomer solution 1 (275 g) were mixed to obtain a radical polymerizable composition 1.

(Preparation of Radical Polymerizable Composition 2)

The monomer solution 3 (100 g) and the monomer solution 1 (275 g) were mixed to obtain a radical polymerizable composition 2.

(Preparation of Radical Polymerizable Composition 3)

The monomer solution 2 (100 g) and the monomer solution 1 (275 g) were mixed to obtain a radical polymerizable composition 3.

(Preparation of Radical Polymerizable Composition 4)

The monomer solution 2 (100 g) and the monomer solution 1 (220 g) were mixed to obtain a radical polymerizable composition 4.

Example 1

The radical polymerizable composition 1 (100 g), lithium bis (fluorosulfonyl) imide (30 g), and a mixed solvent of dimethyl carbonate and ethylene carbonate (mass ratio 2:1) (120 g) were mixed to obtain a liquid composition.

Examples 2 to 4

Liquid compositions were obtained in the same manner as Example 1 except that radical polymerizable compositions 2 to 4 were used instead of radical polymerizable composition 1, respectively.

(Preparation of Test Piece 1)

125 g of the radical polymerizable composition 1 was dissolved in 4.5 g of the photopolymerization initiator 1-hydroxycyclohexylphenyl ketone Omnirad 184 (manufactured by IGM Resins B.V.) to obtain a coating solution. Next, 250 µL of the coating solution was spin-coated onto a substrate having aluminum foil adsorbed on a slide glass, and a test piece 1 was obtained.

(Curability 1 of Radical Polymerizable Compound 1)

Fourier transform infrared spectrometer Frontier (manufactured by Perkin Elmer) was fitted with a diffusion reflection unit (manufactured by Pike technologies) and the test piece 1 was placed in the spectrometer. Then, UV light with a central wavelength of 365 nm and an illuminance of 60 mW/cm$^2$ was emitted under a nitrogen gas atmosphere under the following conditions to verify the degree of progression of curing of the radical polymerizable composition 1 and the presence or absence of monomer residue by attenuation of a first absorption band (C=C stretching vibration band) in region A, a second absorption band (CH in-plane symmetrical bending vibration band) in region B, and a third absorption band (CH out-of-plane bending vibration band) in region C.

Measurement Conditions

Accumulated frequency: 4 times
Optical resolution: 4 cm$^{-1}$
Beam splitter: OptKBr
Light source: MIR
Detector: MCT Table 1 indicates the evaluation results of curability 1 of radical polymerizable composition 1.

TABLE 1

| Emission time of UV light [Sec] | Emission amount of UV light [J/cm$^2$] | Absorption intensity of first absorption band | Absorption intensity of second absorption band | Absorption intensity of third absorption band |
|---|---|---|---|---|
| 0 | 0 | 0.27 | 0.82 | 0.43 |
| 0.43 | 0.026 | 0.25 | 0.87 | 0.40 |

TABLE 1-continued

| Emission time of UV light [Sec] | Emission amount of UV light [J/cm²] | Absorption intensity of first absorption band | Absorption intensity of second absorption band | Absorption intensity of third absorption band |
|---|---|---|---|---|
| 0.87 | 0.052 | 0.14 | 0.50 | 0.23 |
| 1.30 | 0.078 | 0.13 | 0.45 | 0.22 |
| 1.73 | 0.10 | 0.12 | 0.43 | 0.20 |
| 2.16 | 0.13 | 0.11 | 0.41 | 0.18 |
| 3.57 | 0.21 | 0.10 | 0.35 | 0.17 |
| 10 | 0.6 | 0.05 | 0.00 | 0.13 |
| 30 | 1.8 | 0.00 | 0.00 | 0.00 |
| 60 | 3.6 | 0.00 | 0.00 | 0.00 |
| 90 | 5.4 | 0.00 | 0.00 | 0.00 |

From Table 1, it can be seen that until the emission time of UV light is 3.57 seconds, an absorption intensity of a first absorption band, a second absorption band, and a third absorption band gradually decreases as the emission time of UV light increases, and curing of the radical polymerizable composition 1 progresses. Also, the presence of monomer residues is indicated because the infrared absorption spectra with an emission time of 3.57 seconds for UV light has a first absorption band, a second absorption band, and a third absorption band.

In addition, the infrared absorption spectra with the emission time of 10 seconds of UV light have slightly a first absorption band and a third absorption band.

Furthermore, it can be seen that the infrared absorption spectra of UV light with the emission time of 30 seconds, 60 seconds, and 90 seconds have absorption intensities of 0.00 for a first absorption band, a second absorption band, and a third absorption band. That is, the infrared absorption spectra did not have a first absorption band, a second absorption band, and a third absorption band.

Thus, it can be seen that the curing of the radical polymerizable composition 1 has been completed with the emission time of about 30 seconds of UV light.

The radical polymerizable compositions 2 to 4 also confirmed that curing was complete with the emission time of 40 seconds of UV light.

(Preparation of Test Piece 2)

250 µL of the radical polymerizable composition 2 was spin-coated onto a substrate having aluminum foil adsorbed on a slide glass to obtain a test piece 2.

(Curability 2 of Radical Polymerizable Compounds)

The test piece 2 was placed in a vacuum dryer, heated at 80° C. for 6 hours, and then heated at 120° C. for 6 hours. Next, Fourier transform infrared spectrometer Frontier (manufactured by Perkin Elmer) installing MCT detectors of a mercury cadmium-tellurium compound was fitted with VeeMAX III (manufactured by Pike Technologies) with a variable angle reflection accessory. The test piece 2 was placed in the spectrometer to check the degree of progression of curing of the radical polymerizable compositions and the presence or absence of monomer residue by attenuation of the first absorption band (C=C stretching vibration band) in the A region, the second absorption band (CH in-plane symmetrical bending vibration band) in the B region, and the third absorption band (CH out-of-plane bending vibration band) in the C region.

Table 2 indicates the evaluation results of curability 2 of radical polymerizable compositions 1 to 4.

TABLE 2

| | | Absorption intensity of first absorption band | Absorption intensity of second absorption band | Absorption intensity of third absorption band |
|---|---|---|---|---|
| Example 1 | Before curing | 0.38 | 1.14 | 0.89 |
| | After curing | 0.00 | 0.00 | 0.00 |
| Example 2 | Before curing | 0.21 | 0.32 | 0.26 |
| | After curing | 0.00 | 0.00 | 0.00 |
| Example 3 | Before curing | 0.37 | 0.56 | 0.43 |
| | After curing | 0.00 | 0.00 | 0.00 |
| Example 4 | Before curing | 0.31 | 0.99 | 0.38 |
| | After curing | 0.00 | 0.00 | 0.00 |

From Table 2, it can be seen that the infrared absorption spectra of the radical polymerizable compositions 1 to 4 after heat treatment have absorption intensities of 0.00 for a first absorption band, a second absorption band, and a third absorption band. That is, the infrared absorption spectra of the radical polymerizable compositions 1 to 4 after heat treatment did not have a first absorption band, a second absorption band, and a third absorption band.

(Curability 3 of Radical Polymerizable Composition)

The degree of progression of curing of the radical polymerizable compositions and the presence or absence of monomer residue were examined in the same manner as the curability 2 of the radical polymerizable compositions, except that the test piece 1 was used instead of the test piece 2.

As a result, it was confirmed that the infrared absorption spectra of the radical polymerizable compositions 1 to 4 after heat treatment have absorption intensities of 0.00 for a first absorption band, a second absorption band, and a third absorption band. That is, the infrared absorption spectra of the radical polymerizable compositions 1 to 4 after heat treatment did not have a first absorption band, a second absorption band, and a third absorption band.

Comparative Example 1

A liquid composition was obtained in the same manner as Example 1 except that the radical polymerizable composition 1 was replaced by dioxane glycol diacrylate KAYARAD R-604 (manufactured by Nippon Kayaku) containing 100 ppm of methoxyhydroxyquinone as a radical polymerizable composition.

Table 3 indicates the evaluation results of curability 1 to 3 of KAYARAD R-604. In Table 3, the emission time of UV light after UV light emission is 40 seconds.

TABLE 3

| | | Absorption intensity of first absorption band | Absorption intensity of second absorption band | Absorption intensity of third absorption band |
|---|---|---|---|---|
| Curability 1 | Before UV emission | 0.31 | 0.76 | 0.51 |
| | After UV emission | 0.20 | 0.25 | 0.21 |
| Curability 2 | Before heat treatment | 0.31 | 0.76 | 0.51 |
| | After heat treatment | 0.30 | 0.66 | 0.36 |
| Curability 3 | Before heat treatment | 0.31 | 0.76 | 0.51 |
| | After heat treatment | 0.27 | 0.74 | 0.26 |

From Table 3, it was confirmed that the infrared absorption spectrum of KAYARAD R-604 after UV light emission and heat treatment had a first absorption band, a second absorption band, and a third absorption band.

KAYARAD R-604 is not sufficiently cured for any of the curability 1 to 3. Therefore, when electrodes for a lithium-ion secondary battery are manufactured using the liquid composition of Comparative Example 1, there is a concern that an uncured product may be redox-decomposed, leading to a generation of gas that causes a factor of ignition in a charging and discharging process.

In contrast, the radical polymerizable compositions 1 to 4, which constitute the liquid compositions of Examples 1 to 4, are considered to cure well free of leaving ethylenically unsaturated compounds having an oxyethylene group, by heating to a temperature of 100° C. or higher, which is equivalent to the drying step of the electrodes, which is generally practiced in the method of manufacturing a lithium-ion secondary battery. This may be because curing is accelerated by radicals formed from ethylenically unsaturated ethylenic bonds of ethylenically unsaturated compounds having an oxyethylene groups. In addition, both UV curing and thermal curing were confirmed as curing in curability 1 to 3, suggesting that both UV curing and thermal curing are effective.

(Dischargeability)

A substrate was disposed at the stage of the liquid discharge unit EV2500 (manufactured by Ricoh Corporation). Then, after injecting the liquid composition into the liquid discharging device EV2500 (manufactured by Ricoh Corporation), a discharge drive voltage was set to 20 V, and the liquid composition was discharged onto an aluminum foil. At this time, droplets in flight were observed in a drop watch mode of the liquid discharging device EV2500 (manufactured by Ricoh Corporation) to evaluate the dischargeability of the liquid composition.

As a result, droplets were well formed from a nozzle in the liquid compositions of Examples 1 to 4.

(Preparation of Monomer solutions 5 to 7)

100 ppm of methoxyhydroquinone was dissolved in ethoxylated pentaerythritol tetra acrylate ATM-35E (Manufactured by Shin-Nakamura Chemical Co., Ltd.) represented by the following chemical formula 14, ethoxylated polyglycerin polyacrylate (Manufactured by Shin-Nakamura Chemical Co., Ltd.) represented by the following chemical formula 15, and 2-acryloyloxyethylsuccinate A-SA (Manufactured by Shin-Nakamura Chemical Co., Ltd.), respectively, to obtain monomer solutions 5 to 7.

[Chemical Formula 14]

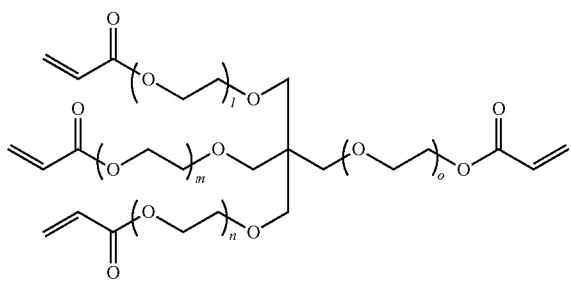

In the chemical formula above, an average of l+m+n+o is 35.

[Chemical Formula 15]

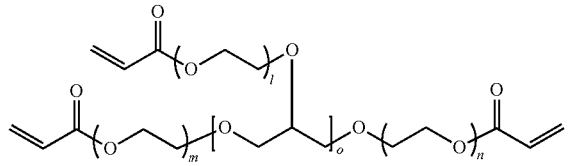

In the chemical formula above, an average of l+m+n+o is 27.

(Preparation of Radical Polymerizable Composition 5)

The radical polymerizable composition 2 (100 g), the monomer solution 5 (1.0 g), and the monomer solution 6 (2.5 g) were mixed to obtain a radical polymerizable composition 5.

Example 5

The radical polymerizable composition 5 (100 g), the monomer solution 7 (1.0 g), the lithium bis (fluorosulfonyl) imide (30 g), and a mixed solvent of dimethyl carbonate and ethylene carbonate (mass ratio 2:1) (120 g) were mixed to obtain a liquid composition.

In the evaluation of curability 1 of the radical polymerizable composition 5, it was confirmed that the infrared absorption spectrum of the radical polymerizable composition 5 has absorption intensities of 0.00 for a first absorption band, a second absorption band, and a third absorption band.

In addition, when the curability 2 and 3 of the radical polymerizable composition 5 were evaluated, it was confirmed that the infrared absorption spectrum of the radical polymerizable composition 5 after the heat treatment had the absorption intensities of 0.00 for a first absorption band, a second absorption band, and a third absorption band.

Moreover, when the dischargeability of the liquid composition of Example 5 was evaluated, the liquid composition of Example 5 had well formed droplets from a nozzle.

(Preparation of Alumina Particle Dispersions)

Alumina particles AKP-3000 (manufactured by Sumitomo Chemical Co., Ltd.) (100 g) having an average particle size of 0.7 μm, a dispersing agent MALIALIM SC-0708A (manufactured by NOF Corporation) (5 g), and methyl ethyl ketone (140 g) were mixed, then the particles were dispersed using a homogenizer G-smasher (manufactured by Rix Corporation) to obtain an alumina particle dispersion liquid having a solid content concentration of 40% by mass.

Example 6

The liquid composition of Example 5 (8.0 g) was added to the alumina particle dispersion liquid (100 g) to obtain a liquid composition.

When the dischargeability of the liquid composition of Example 6 was evaluated, the liquid composition of Example 6 had well formed droplets from a nozzle.

(Adhesion of Gel Electrolyte Film to Aluminum Foil)

After injecting the liquid composition of Example 6 into a liquid discharging device EV2500 (manufactured by Ricoh Corporation), a discharge drive voltage was set to 20 V, and the liquid composition was discharged onto an aluminum foil. Next, the aluminum foil from which the liquid composition was discharged was placed in a vacuum dryer, heated at 80° C. for 6 hours, and then heated at 120° C. for 6 hours to form a gel electrolyte film.

A peel strength of the gel electrolyte film was measured in accordance with JIS Z 0237:2009 using VPA (Versatile Peel Analyzer) (manufactured by Kyowa Interface Science Co., Ltd.). The peel strength was 60.2 N/m, and it was confirmed that the gel electrolyte film adhered well to the aluminum foil.
(Adhesion to Aluminum Foil of Alumina Film)

The peel strength of the alumina film was measured in the same manner as the adhesion of the gel electrolytic film to the aluminum foil, except that the alumina particle dispersion liquid was used instead of the liquid composition of Example 6. It was confirmed that the peel strength was 0.8 N/mm and that the alumina film did not adhere well to the aluminum foil.
(Preparation of Monomer Solution 8)

100 ppm of methoxyhydroquinone was dissolved in the phosphate monomer KAYAMERPM-2 (manufactured by Nippon Kayaku Co., Ltd.) to obtain a monomer solution 8.

Example 7

The radical polymerizable composition 5 (100 g), the monomer solution 8 (2.5 g), lithium bis (fluorosulfonyl) imide (30 g), and a mixed solvent of dimethyl carbonate and ethylene carbonate (mass ratio 2:1) (120 g) were mixed to obtain a mixture.

A liquid composition was obtained in the same manner as Example 6 except that the mixture was used instead of the liquid composition of Example 5.
(Adhesion of Gel Electrolyte Film to Copper Foil)

After injecting the liquid composition of Example 7 into a liquid discharging device EV2500 (manufactured by Ricoh Corporation), a discharge drive voltage was set to 20 V, and the liquid composition was discharged onto a copper foil. Then, the copper foil in which the liquid composition was discharged was placed in a vacuum dryer, heated at 80° C. for 6 hours, and then heated at 120° C. for 6 hours to form a gel electrolyte film.

A peel strength of the gel electrolyte film was measured in accordance with JIS Z 0237:2009 using VPA (Versatile Peel Analyzer) (manufactured by Kyowa Interface Science Co., Ltd.). It was confirmed that the peel strength was 63.3 N/m and that the gel electrolyte film adhered well to the copper foil.
(Adhesion of Alumina Film to Copper Foil)

A peel strength of the alumina film was measured in the same manner as the adhesion of the gel electrolyte film to the copper foil, except that the alumina particle dispersion liquid was used instead of the liquid composition of Example 7. It was confirmed that the peel strength was 0.8 N/m and that the alumina film did not adhere well to the copper foil.

Thus, when the liquid compositions of Examples 6 and 7 are used, the gel electrolyte films can be formed on the aluminum foil and the copper foil, respectively. Applying a gel electrolyte film to an electrochemical device can suppress a short circuit and improve the safety of the electrochemical device, even when external stimuli such as vibration and shock are applied to the device.

Example 8

(Preparation of Negative-Electrode)

Graphite (97 parts by mass), carboxymethylcellulose (1 part by mass), styrene-butadiene rubber (2 parts by mass), and water (100 parts by mass) were mixed to obtain a liquid composition for a negative-electrode composite material layer.

The liquid composition for the negative-electrode composite material layer was applied to a copper foil and then dried to form the a negative-electrode composite material layer with a density per unit area (one side) of 9.0 mg/cm$^2$ on both sides of the copper foil. Then, the copper foil was punched out so that the surface which the liquid composition was applied was 30 mm×50 mm and the surface which the liquid composition was not applied was 10 mm×11 mm. The punched-out copper foil was then compression-molded using a roll press so that the volume density was 1.6 g/cm$^3$, resulting in forming a negative-electrode.

After injecting the liquid composition of Example 7 into a liquid discharging device EV2500 (manufactured by Ricoh Corporation), a discharge drive voltage was set to 20 V, and the liquid composition was discharged onto the negative-electrode composite material layer. The copper foil in which the liquid composition was discharged was then placed in a vacuum dryer, heated at 80° C. for 6 hours, and then heated at 120° C. for 6 hours to form a gel electrolyte film to obtain a negative-electrode.
(Preparation of Positive-Electrode)

Lithium cobalt composite oxide ($LiCoO_2$) (92 parts by mass), acetylene black (3 parts by mass), polyvinylidene fluoride (PVDF) (5 parts by mass), and N-methylpyrrolidone (100 parts by mass) were mixed to obtain a liquid composition for a positive-electrode composite material layer.

The liquid composition for the positive-electrode composite material layer was applied to an aluminum foil and then dried to form a positive-electrode composite material layer with a density per unit area (one side) of 18.4 mg/cm$^2$ on both sides of the aluminum foil. Then, the aluminum foil was punched out so that the surface to which the liquid composition was applied was 28 mm×48 mm and the surface to which the liquid composition was not applied was 10 mm×13 mm. The punched-out aluminum foil was then compression-molded using a roll press so that the volume density was 2.8 g/cm$^3$, resulting in forming a positive-electrode.
(Preparation of Electrolyte Solution)

$LiPF_6$ was dissolved in a mixture of ethylene carbonate, dimethyl carbonate, and methyl ethyl carbonate in a volume ratio of 1:1:1 so that the concentration was 1.5 mol/L to obtain an electrolyte solution.
(Production of Lithium-Ion Secondary Battery)

A separator with a thickness of 15 µm was sandwiched to alternately face twenty-three positive electrodes and twenty-four negative electrodes, and then the terminals were welded to the positive electrodes and the negative electrodes to obtain an electrode element.

The front and back sides of the electrode element were covered with a laminate sheet and the three sides were heat-sealed. Then, after the electrolyte solution was injected, the laminate sheet was sealed under reduced pressure, and a lithium-ion secondary battery was obtained.

Comparative Example 2

A lithium-ion secondary battery was obtained in the same manner as Example 8, except that a gel electrolyte film was not formed when the negative-electrode was prepared.
(Retention Rate of Discharge Capacity of Lithium-Ion Secondary Battery and Deposition Amount of Lithium Metal)

Draw-lines of the positive and negative electrodes of the lithium-ion secondary battery were connected to a charging and discharging device, and the lithium-ion secondary battery was charged at a maximum voltage of 4.2 V at a current rate of 0.2 C for 5 hours at a constant current voltage and then left in a thermostat at 25° C. for 5 days. The lithium-ion secondary battery was then discharged to a constant current rate of 2.5 V at a current rate of 0.2 C and charged for the first time.

Next, the lithium-ion secondary battery was charged at a current rate of 1 C, then discharged at a current rate of 2 C for 1000 cycles, and the retention rate of the discharge capacity of the lithium-ion secondary battery was measured.

As a result, the retention rate of the discharge capacity of the lithium-ion secondary battery of Example 8 and Comparative Example 2 was 86% and 81%, respectively.

Next, after the lithium-ion secondary battery was dismantled, an AXIS ULTRA (manufactured by Shimadzu Kratos) X-ray photoelectron spectroscopy (XPS) device was used to analyze the deposition amount of lithium metal of the negative electrode. As a result, the lithium-ion secondary battery of Example 8 was 14% less than that of the lithium-ion secondary battery of Comparative Example 2.

From the above, it can be seen that the lithium-ion secondary battery of Example 8 has excellent cycle characteristics. The reason for this is considered to be that the formation of the gel electrolyte film on the negative-electrode composite material layer prevents the deposition of lithium metal of the negative-electrode.

(Nail Penetration Test of Lithium-Ion Secondary Battery)

Three lithium-ion secondary batteries of Example 8 and Comparative Example 2, respectively, were prepared.

Draw-lines of the positive and negative electrodes of each lithium-ion secondary battery were connected to a charging and discharging device, and after the lithium-ion secondary battery was fully charged, a nail with 4.5 mm in diameter was penetrated in the direction perpendicular to the electrode-laminated direction. The presence or absence of smoke, ignition, and unusual odor were observed in a state of intentional short-circuiting, and the temperature of the draw-lines was measured.

Table 4 indicates the nail penetration test results for each lithium-ion secondary battery.

TABLE 4

|  | No. | Smoke | Ignition | Odor | Temperature of draw-lines |
| --- | --- | --- | --- | --- | --- |
| Example 8 | 1 | No | No | No | No change |
|  | 2 | No | No | No | No change |
|  | 3 | No | No | No | No change |
| Comparative | 1 | No | No | Yes | 110° C. |
| Example 2 | 2 | Yes | No | Yes | 180° C. |
|  | 3 | Yes | No | Yes | 180° C. |

From Table 4, the temperature of the draw-lines did not change in the lithium-ion secondary battery of Example 8, and did not generate smoke, ignition, or odor. It is considered that this is because the insulation of the surface of the negative-electrode improved and the safety of the lithium-ion secondary battery improved by forming the gel electrolyte film on the negative-electrode composite material layer.

In contrast, a bad odor was generated in the lithium-ion secondary battery of Comparative Example 2 because the temperature of the draw-lines increased, although a variation was observed.

What is claimed is:

1. A liquid composition for manufacturing electrodes, the liquid composition comprising:
    a radical polymerizable composition containing an ethylenically unsaturated compound having an oxyethylene group and a polymerization inhibitor,
    wherein the polymerization inhibitor comprises methoxyhydroquinone,
    wherein infrared absorption spectra before curing the radical polymerizable composition include a first absorption band in a range of 1640 to 1620 cm$^{-1}$, a second absorption band in a range of 1430 to 1400 cm$^{-1}$, and a third absorption band in a range of 820 to 800 cm$^{-1}$, and the second absorption band has a greater absorption intensity than the third absorption band, and the third absorption band has a greater absorption intensity than the first absorption band,
        wherein the infrared absorption spectra after curing the radical polymerizable composition are substantially free of the first absorption band, the second absorption band, and third absorption band,
    wherein a mass ratio of the polymerization inhibitor to the ethylenically unsaturated compound is 10 to 500 ppm, and
    wherein the liquid composition has a viscosity at 25° C. of 18 mPA·s or less.

2. The liquid composition according to claim 1, wherein the curing is a process of adding 4.5 parts by mass of 1-hydroxycyclohexylphenyl ketone with respect to 125 parts by mass of the radical polymerizable composition and emitting 2.4 J/cm$^2$ of ultraviolet light with a central wavelength of 365 nm under a nitrogen gas atmosphere.

3. The liquid composition according to claim 1, wherein the curing is a process for curing the radical polymerizable composition by heating the radical polymerizable composition at 80° C. for 6 hours under reduced pressure and then heating at 120° C. for 6 hours.

4. The liquid composition according to claim 1, wherein the curing is a process of adding 4.5 parts by mass of 1-hydroxycyclohexylphenyl ketone with respect to 125 parts by mass of the radical polymerizable composition and heating under reduced pressure at 80° C. for 6 hours, followed by further heating at 120° C. for 6 hours.

5. The liquid composition according to claim 1, further comprising a lithium salt.

6. The liquid composition according to claim 1, further comprising insulating inorganic particles.

7. The liquid composition according to claim 1, further comprising an ethylenically unsaturated compound free of an oxyethylene group.

8. The liquid composition according to claim 7, wherein the ethylenically unsaturated compound free of the oxyethylene group contains a carboxyl group, a sulfonic acid group, or a phosphate group.

9. A method of manufacturing electrodes, the method comprising a step of discharging the liquid composition of claim 1 onto a substrate.

10. A method of manufacturing an electrochemical device, the method comprising a step of manufacturing electrodes using the method of claim 9.

11. The liquid composition according to claim 1, which is cured, thereby forming a gel electrolyte film.

12. The liquid composition according to claim 1, wherein the ethylenically unsaturated compound having an oxyethylene group comprises one or more of a methoxypolyethylene glycol acrylate, an ethoxylated glycerin triacrylate, an ethyoxylated pentaerythritol tetracrylate, an ethyoxylated polyglycerin polyacrylate, or 2-acryloyloxyethylsuccinate.

13. The liquid composition according to claim 12, further comprising a lithium salt.

14. The liquid composition according to claim 13, wherein the lithium salt comprises lithium bis(fluorosulfonyl) imide.

15. The liquid composition according to claim 12, wherein the composition is free of discotic liquid crystals.

16. The liquid composition according to claim 1, wherein the composition is free of discotic liquid crystals.

17. The liquid composition according to claim 1, wherein the mass ratio of the polymerization inhibitor to the ethylenically unsaturated compound is 100 to 500 ppm.

18. The liquid composition according to claim 1, wherein the ethylenically unsaturated compound having an oxyethylene group is other than methoxypolyethylene glycol acrylate.

19. The liquid composition according to claim 1, wherein the ethylenically unsaturated compound having an oxyethylene group comprises ethoxylated glycerin triacrylate, ethoxylated pentaerythritol tetra acrylate, ethyoxylated polyglycerin polyacrylate, or 2-acryloyloxyethylsuccinate.

\* \* \* \* \*